Aug. 1, 1967 M. YOUDIN 3,334,260
RADIATION DETECTOR AND METHOD OF FABRICATING THE SAME
Filed May 12, 1964
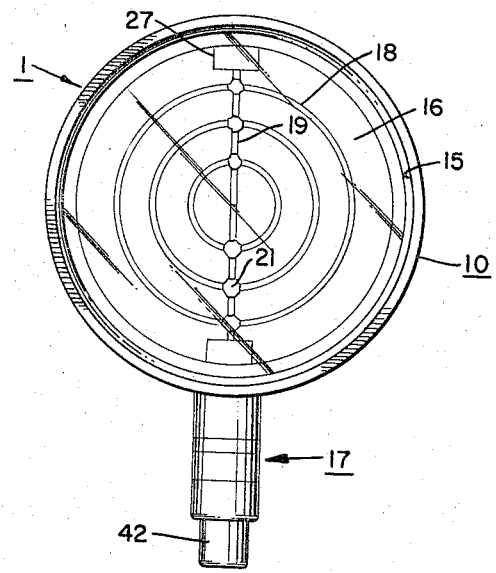
FIG. 1
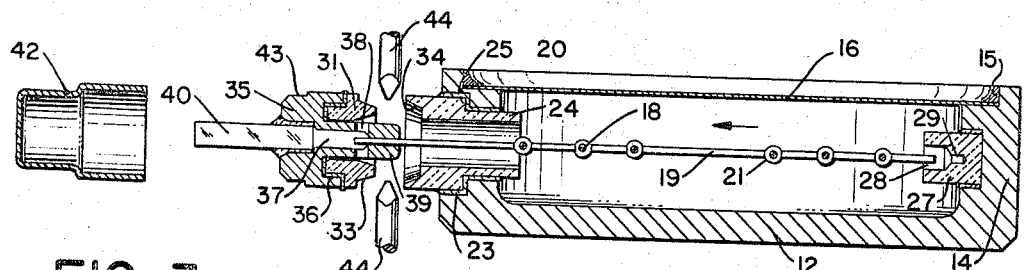
FIG. 2
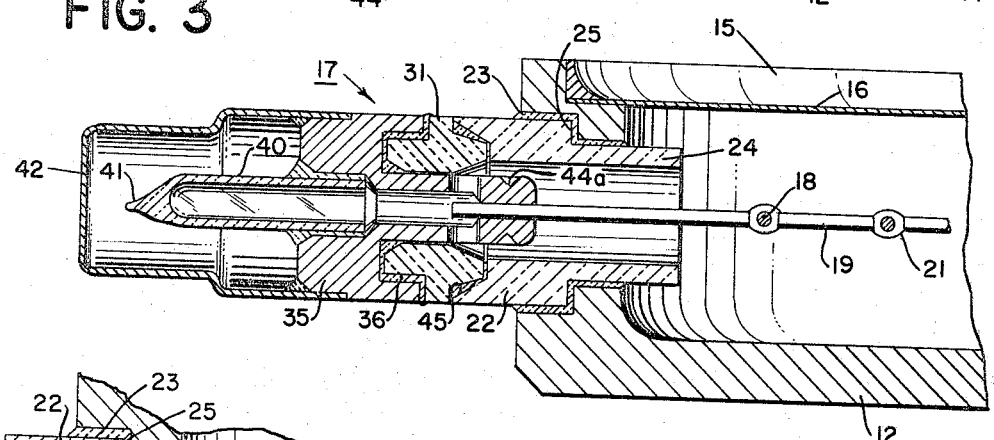
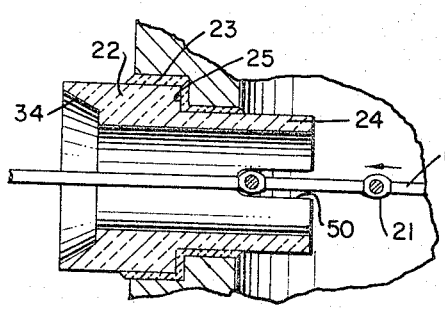
FIG. 4
INVENTOR.
MYRON YOUDIN
BY Darby & Darby
ATTORNEYS

United States Patent Office 3,334,260
Patented Aug. 1, 1967

3,334,260
RADIATION DETECTOR AND METHOD OF
FABRICATING THE SAME
Myron Youdin, Flushing, N.Y., assignor to Eon Corporation, Brooklyn, N.Y., a corporation of New York
Filed May 12, 1964, Ser. No. 366,751
10 Claims. (Cl. 313—93)

This invention relates to detectors for alpha, beta and gamma radiation, and more particularly to an improved construction and method for fabricating detectors of the proportional and Geiger counter types for alpha, beta and gamma radiation.

One common type of detector particularly useful for detecting alpha, beta and/or gamma radiation takes on the form of a metallic housing, which serves as one of the electrodes, for example the cathode, of the detector. A second electrode, the anode, is located within the housing and an electric field is produced between the two electrodes. The housing contains a quantity of a gas or vapor, which is ionized by incoming radiation passing through the housing or one or more radiation permeable windows therein. The resultant ions are collected by the anode electrode located within the housing and the number of ions, or proportion thereof, is counted by external electrical circuits connected to the detector.

In prior art detectors of this type, two arm members or extensions are provided which extend beyond the periphery of the housing. The first of these extensions contains the support for at least a portion of the anode member and also has an electrical connector onto which the potential for the anode is to be applied. The second extension holds the glass tubulation through which the housing is exhausted. A detector of this general type is shown in the patent of Nicholas Anton, No. 2,923,586.

In detectors of the prior art type referred to above, the use of the two extensions gives rise to several disadvantages. First of all, the use of two extensions is relatively space-consuming, especially where the detector is designed for use in environments having restricted space limitations. Secondly, the extension for the exhaust tubulation provides an additional weakness in the structure of the wall of the detector and a potential separate trouble source. The latter occurs because if the protective cover normally applied to the exhaust tubulation is broken off, then the glass tubulation may be broken, so that air can enter into the detector. As an additional problem, two metal to glass or ceramic seals must be provided on the wall of the detector, one for the tubulation and the other for the anode support. As is known, these seals are somewhat difficult to make in production and a considerable number of bad seals may arise in any one production batch of detectors which cause them to be rejected.

The present invention is directed to an improved radiation detector and method of fabricating the same in which only a single extension is provided on the detector housing to serve as both the electrical connector to the anode and the support therefor and as the exhaust tubulation. This is accomplished by the use of a novel support for the anode electrode held within the detector housing which is constructed in such a manner to provide not only the electrical connection but also serve as a gas passageway for the exhaust of the housing.

In a preferred embodiment of the invention the single extension arm is formed by a first insulator member which is sealed to the housing wall, a second insulator member sealed to the first, and a combined conductive anode support and connector which fits within at least one of the insulators and is sealed to the second insulator. A gas passage is provided through the conductive anode support and the insulators to the interior of the housing. The anode is held by the conductive support and a tubulation is provided to exhaust the housing and introduce a desired quantity of a gas through the gas passage and then to seal off the detector. By using this construction a detector of considerably simpler construction is provided in which only one extending arm is needed. Also, only a single metal to insulating material seal is made at the housing which results in an improvement in the production process of the detectors and a reduction in the number of rejects.

It is therefore an object of the present invention to provide an improved radiation detector tube and the method of constructing the same.

Another object is to provide a radiation detector of the pancake type in which only a single projection is provided on the detector housing.

A further object is to provide an improved radiation detector and the method of making the same in which only a single projection is provided which serves both as the support for and electrical connector to an electrode within the housing and as a passageway through which the gas in the detector housing is exhausted and/or inserted.

Other objects and advantages of the present invention will become more apparent upon reference to the following specification and annexed drawings, in which:

FIGURE 1 is a top view of a fully assembled detector made in accordance with the invention;

FIGURE 2 is a side elevational view of the detector of FIGURE 1, taken in section and shown partially exploded;

FIGURE 3 is an enlarged side elevational view of a portion of the detector of FIGURE 2 with the projecting arm assembly shown fully assembled; and FIGURE 4 is a view taken partially in a section of another embodiment of one of the insulator members of FIGURES 2 and 3.

FIGURE 1 shows a complete assembled radiation detector 1 of the so-called pancake type, made in accordance with the invention. The detector comprises an outer housing 10 of a suitable conductive material, such as No. 446 stainless steel, or other suitable metal alloy. As illustrated, the housing has an open top, a bottom wall 12 and a side wall 14 which terminates in a shoulder 15. The open top of the housing 10 is sealed by a thin window 16 of a radiation-permeable material sealed onto the shoulder 15. It should be understood that the housing may have both an open top and bottom to accomodate two radiation-permeable windows, one on each side of the housing, or the housing may be a completely enclosed metallic structure with no windows. The latter construction is used in gamma detectors. Where two windows 16 are used, another shoulder 15 is provided on the other wall of the housing.

When a window is used, suitable materials which may be used for the window, all of which are conventional in the art, are stainless steel on the order of .0005–.0020 inch thick, mica, nylon, cellophane, or any other synthetic plastic material which preferably has a low molecular weight. The insulating type materials may be left uncoated or coated with a metallic material. All of these materials and the choice of thicknesses therefor are conventional in the art and are determined by the use to which the detector is to be put. Therefore, they in themselves form no part of the invention.

The conductive housing 10 serves as the cathode for the detector, in the conventional manner, and it is usually connected to the reference potential point of the counting circuits or to a point of negative potential. Disposed within the housing is a conductive anode electrode 18. The anode 18 may be of any desired shape or size. As illustrated, it is formed by a number of spaced concentric rings mounted on a diametrical cross-piece 19 by spot welding, or any other suitable technique. It should be understood that the particular shape of anode structure is not critical and any desired shape or size may be used as desired, including one or more rings or other shaped structures mounted on a cross-piece. Where a cross-piece is used, such as 19, onto which other members are welded, the weld points are covered by an insulating material as shown at 21, to prevent counting due to surface irregularities produced by the welding.

Where a ruggedized construction is desired for the detector and for the anode, the cross-piece 19 preferably has a diametrical extension, which is held within an insulator support member 27 mounted on the inner side wall of the housing. In some case, such as where the anode structure is light and the vibration requirements of the detector are not severe, the support member 27 may be eliminated.

The end of the anode 18 to which electrical connection is to be made, is held by a conductive support within a single arm 17 projecting from the wall of the housing. An electrical connection is provided for the anode electrode in the arm 17, which is brought out to an external terminal 42. The terminal 42 is connected to a source of potential (not shown) which is positive with respect to the cathode. A tubulation (not shown in FIG. 1) is provided within the extending arm 17 through which gas is exhausted and/or introduced into the housing and the housing sealed off.

To operate the detector, a gas is introduced to the sealed housing and a potential field provided between the anode and cathode electrodes 18 and 10. Radiation, in the form of alpha and beta particles passing through the radiation-permeable window or windows 16, or gamam photons interacting with the metallic housing 10 to produce secondary electrons, ionize the gas and the ionization count is produced by another instrument which is connected to the detector. The counter instrument may be either of the pulse or proportional type, both of which are conventional in the art.

As described previously, in prior art detectors it is the practice to provide two arm extensions on the detector housing. One of the extensions is to house the support and electrical connector for the anode electrode while the other extension is to house the tubulation. In accordance with the present invention both of these functions are combined to a single extension of novel construction, a preferred embodiment of which is shown in detail in FIGURES 2 and 3.

As shown in FIGURES 2 and 3 the side wall 14 of the housing 10 has a hole 20 therein into which is inserted a first tubular insulator 22 which preferably is of a ceramic material. Of course, any suitable insulating material may be used. The insulator 22 is sealed in the hole by a suitable metal to ceramic seal 23 to prevent any gas leakage around or through the hole 20. It should be noted that both the hole 20 and the insulator 22 are shouldered at 25 to provide a good mechanical construction. The insulator 22 has a piece 24 of narrower diameter which extends for a short distance into the housing.

The insulated support member 27, which is also preferably of ceramic material, is sealed within the housing on the side wall 14 at a point diametrically opposite the hole 20 and the insulator 22. The support 27 has a bore 28 extending partially therethrough and a tapered down section 29 of substantially the same diameter and shape as the cross-piece 19 to hold one end of the cross-piece.

The remainder of the arm assembly 17 includes a generally ring-shaped second insulator member 31. The second insulator 31 has a chamfered or tapered leading edge 33 which fits within the matching tapered entrance 34 of the first insulator 22. The other end of the second insulator 31 has a shoulder which is placed within and sealed to a conductive connector 35. The connector 35 has an extension 39 which passes completely through the second insulator 31 and extends partially into the bore of the first insulator when the structure 17 is fully assembled. A bore or passage 37 is provided over the length of connector 35 and an exhaust hole 38 is drilled crosswise of the extension piece 39.

The end of the cross-piece 19 opposite the support 27 is held within and electrically connected to the connector 35 by crimping, spot-welding or other suitable technique at point 45. The arm structure 17 is completed by a tubulation 40 formed in the passage 37 of connector 35. The housing is exhausted and/or gas introduced through the tubulation which is then tipped off at 41. The terminal 42 fits over a shoulder 43 on the connector 35 and is electrically connected thereto.

The assembly of the radiation detector of FIGS. 2 and 3 is accomplished in the following manner. The housing 10 is first formed to the desired size with the hole 20 and the insulating support 27 is sealed to the wall 14. Next, the first insulator member 22 is placed within the hole 20 and sealed to the housing by any suitable metal to ceramic sealing technique.

The second insulator 31 and the metal connector 35 are fastened together by a suitable ceramic to metal seal 36, and the tubulation 40 is fused or sealed into and in communication with passage 27. It should be noted that the cross-hole 38 is adjacent and in communication with an open portion of insulator 31.

As the next step in the assembly process, the anode 18 is placed within the housing through the open top and one end of the cross-piece 19 is pushed through the bore in the first insulator 22. This end is then placed in the bore 37 in the metal connector 35 and a mechanical crimp is made by a pair of tools 44 at point 44a to hold the end of the anode and make electrical connection therewith. Any other suitable technique may be used to make electrical connection, such as by spot-welding.

After the cross-piece 19 is connected to the connector 35, the extension 39 of the connector is moved into the bore of the insulator 22 until the chamfered edge 33 of the second insulator is adjacent the tapered entrance 34 of the bore. This assembly is accomplished so that the free end of the cross-piece 19 is placed within the bore 28 of the support member 27, if a support member is used.

Where one or more windows 16 are used, the next step in the assembly is to place the one or two windows 16 on the respective shoulder 15 of the housing. A small amount of powdered glass or other material suitable to form a seal between a window and the housing, is applied between the face of the window and a shoulder 15. Of course, if no windows 16 are used, then the step is omitted.

An amount of powdered glass or other suitable sealing material is also provided between the two insulator pieces 22 and 31 to form a seal 45. A glass seal may also be provided between the cross-piece 19 and the support member 27, if desired.

The complete assembly is then placed into a kiln which is fired. At this time, the powdered glass between the window or windows and the housing will melt and seal the respective openings, while the powdered glass between the two ceramic insulators 22 and 31 will also melt and form a ceramic to ceramic seal 45. It should be noted that the latter is a ceramic to ceramic seal, rather than a ceramic to metal seal, which is considerably more difficult to make.

As can be seen in FIGURES 2 and 3, the glass tubulation 40 extends within the metal piece 35 up to the narrow portion of passage 37. The tubulation may also surround a portion of a cross-piece 19 if it does not close cross-hole 38 or bore 37. The interior of the housing, which is now sealed except for the passage provided by the tubulation 40, bore 37 and cross-hole 38, is exhausted by the tubulation and a quantity of a desired gas is introduced. It should be noted that there is a passage into the interior of the housing through the bore of the first insulator member 22.

The glass tubulation 40 is then tipped-off at 41 and is covered by a protective metallic end cap or terminal 42 which is electrically connected, such as by soldering or welding, to the connector 35.

It should be noted that the construction of the detector of FIGURES 1-3 provides several advantages. First of all, it eliminates the separate projection which would normally be needed for the tubulation, since the arm 17 accomplishes this function due to its unique construction. Secondly, only one metal to ceramic seal is needed and a ceramic to ceramic seal is formed between the two insulator members 22 and 31. As pointed out before, this is considerably easier to achieve than the additional metal to ceramic seal, which would normally be required for the tubulation. It should also be noted that the metal to ceramic seals, i.e., 23 and 36, are formed as sub-assemblies, since the first insulator member 22 is sealed to the housing in the initial step and the metal end piece 35 is sealed to the second insulator 31 in another sub-assembly step.

The portion 24 of the first insulator 22, which extends into the interior of the housing, provides an additional advantage. This arrangement reduces the leakage path between the anode and the cathode, since a relatively large volume insulating member is provided around the area where the anode comes closest to the cathode.

FIGURE 4 shows another embodiment of the invention wherein a modification is made to the first insulator 22. In this case, the extending portion 24 of the insulator has a slot 50 cut diametrically across the walls thereof. This permits the outermost ring of the anode electrode to be pulled back into the slot 50 during the assembly procedure. When this arrangement is provided, the end of the crosspiece 19, which is fastened to the connector 35, may be made considerably shorter.

While preferred embodiments of the invention have been described above, it will be understood that these are illustrative only, and the invention is to be limited solely by the appended claims.

What is claimed is:
1. A pancake-type radiation detector comprising:
 a first electrode formed by a housing of electrically conductive material having a hole in the wall thereof,
 a second electrode within the housing having at least one ring with a conductive cross-piece connected thereto,
 a support and electrical connection means for one end of the cross-piece located at said hole including:
  (a) an insulator means sealed in said hole in said wall,
  (b) an electrical connector sealed to said insulator and having means for holding the one end of the cross-piece, a gas passage being provided through said insulator and connector to the interior of the housing,
  (c) and a tubulation sealing off said gas passage,
 and a second insulated member mounted on said wall entirely internally of said housing for holding the other end of said cross-piece.
2. A pancake-type radiation detector comprising:
 a first electrode formed by a housing of electrically conductive material having a hole in the wall thereof,
 a second electrode within the housing having a cross-piece with an end to support the electrode and for making electrical connection thereto,
 a support and electrical connection means for said end of said second electrode located at said hole including:
  (a) a first insulator member sealed in said hole in said wall, said first insulator member having a gas passage therethrough,
  (b) an assembly comprising a second insulator member, an electrical connector sealed to said second insulator member, a gas passage being formed through the connector and said second insulator member, said end of said second electrode being electrically connected to the connector and the second electrode being held at least in part thereby,
  (c) a seal between the first and second insulator members,
  (d) and a tubulation in communication with the gas passage through which gas may be conveyed with respect to the housing.
3. A radiation detector as set forth in claim 2, wherein said first insulating member has a portion extending into the interior of the housing through which the end of the cross piece extends for decreasing the leakage current path between the first and second electrodes.
4. A radiation detector as set forth in claim 3, wherein said extending portion of said first insulating member has slots therein for accommodating a portion of the second electrode when said second electrode is moved toward the arm extension member.
5. A radiation detector as set forth in claim 3, wherein said second electrode has a number of concentric rings and slots are provided in the portion of the first insulator extending into the housing for accommodating the outer concentric ring of the anode when moved toward the extension arm.
6. The radiation detector of claim 2 wherein said first and second insulator members are sealed to each other exterior of the housing and the insulator members and cross-piece are dimensioned so that the electrode is connected to said electrical connector even when said assembly of said second insulator and said electrical connector are spaced from said first insulator member by a predetermined distance.
7. A radiation detector as set forth in claim 6, wherein a second insulated support member is provided on an internal wall of the housing to hold the other end of said cross-piece.
8. A pancake-type radiation detector comprising:
 a first electrode formed by a housing of electrically conductive material having a hole in the wall thereof,
 a second electrode within the housing having at least one ring with a conductive cross-piece connected thereto,
 a support and electrical connection means for one end of the cross-piece located at said hole including:
  (a) a tubular first insulator member sealed in said hole,
  (b) an assembly comprising a hollow second insulator member, an electrical connector sealed to the second insulator member, a gas passage being formed through the connector and said second insulator member, one end of the cross-piece being electrically connected to the connector and the second electrode being held within the housing at least in part thereby,
  (c) a seal between the first and second insulators,
  (d) and a tubulation in communication with the gas passage through which gas may be conveyed with respect to the housing,
 and a second insulated support member within said housing on the wall thereof for holding the other end of the cross-piece.
9. A radiation detector as set forth in claim 8, wherein a conductive cap is placed over the tubulation and is electrically connected to the connector.
10. The method of fabricating a radiation detector having a housing of electrically conductive material which serves as a first electrode, and a second electrode having a supporting end comprising the steps of:
- forming an opening in the conductive wall,
- sealing a first member of insulating material with a gas passage therethrough to said wall in said opening,
- forming a sub-assembly of a second member of insulating material and an electrical connector, both of which have gas passages,
- inserting said second electrode in said housing and passing the supporting end through the first insulator member,
- electrically connecting the supporting end to the electrical connector,
- sealing said first and second members of insulating material together,
- exhausting the atmosphere within the housing through said gas passages,
- and sealing off said gas passages.

References Cited

UNITED STATES PATENTS

| | | | |
|---|---|---|---|
| 2,776,390 | 1/1957 | Anton | 313—93 |
| 2,921,216 | 1/1960 | Chubb | 313—93 |
| 2,921,217 | 1/1960 | Chubb | 313—93 |
| 2,962,615 | 11/1960 | Anton | 313—284 |
| 3,052,797 | 9/1962 | Kronenberg | 313—93 |

JAMES W. LAWRENCE, *Primary Examiner.*

R. JUDD, *Assistant Examiner.*